No. 655,066. Patented July 31, 1900.
S. W. DODDS & G. H. ROBERTSON.
WEIGHING MECHANISM FOR REFRIGERATORS.
(Application filed June 6, 1900.)
(No Model.)
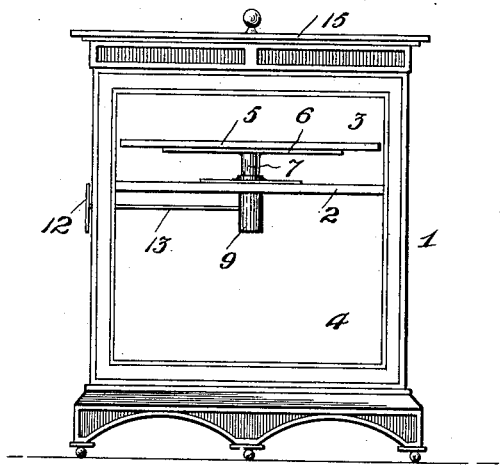
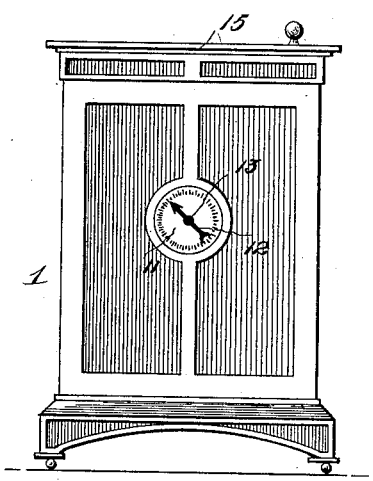
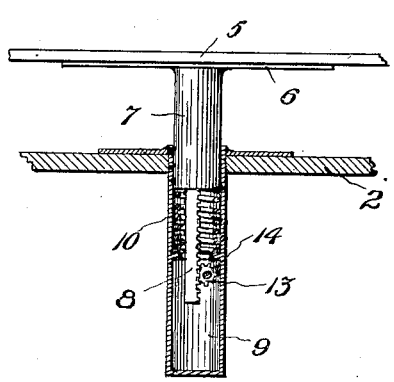

UNITED STATES PATENT OFFICE.

SAMUEL W. DODDS AND GEORGE H. ROBERTSON, OF PADUCAH, KENTUCKY.

WEIGHING MECHANISM FOR REFRIGERATORS.

SPECIFICATION forming part of Letters Patent No. 655,066, dated July 31, 1900.

Application filed June 6, 1900. Serial No. 19,264. (No model.)

*To all whom it may concern:*

Be it known that we, SAMUEL W. DODDS and GEORGE H. ROBERTSON, citizens of the United States, residing at Paducah, in the county of McCracken and State of Kentucky, have invented certain new and useful Improvements in Weighing Mechanism for Refrigerators; and we do declare the following to be a full, clear, and exact description of the invention, such as will enable others skilled in the art to which it appertains to make and use the same.

Our invention relates to improvements in refrigerators, and has for one object the production of a simple, durable, and efficient weighing attachment for refrigerators and ice-boxes by which the quantity of ice placed therein is automatically weighed and the weight of the ice indicated on the exterior to the view of the purchaser.

A further object of the invention is to provide an attachment of this character which may be applied to existing refrigerators and ice-boxes of ordinary construction and in which the weighing mechanism is inclosed and protected from injury by the ice and water.

With these and other minor objects in view the invention consists in certain novel features of construction, combination, and arrangement of parts, as will be hereinafter more fully described, and particularly set forth in the appended claims.

In the accompanying drawings, Figure 1 is a front elevation of a refrigerator or ice-box embodying our invention. Fig. 2 is a side view of the same. Fig. 3 is a section through the fixed partition and weighing mechanism attached thereto.

Referring now more particularly to the drawings, in which like reference-numerals designate corresponding parts throughout the several views, the numeral 1 represents a refrigerator or ice-box of any preferred size and construction, having its interior divided by a fixed partition 2 into upper and lower chambers 3 and 4, the former designed to receive the ice and the latter the articles to be cooled.

Located in the ice-chamber 3 is a vertically-movable platform 5, to the under side of which is attached a plate 6, carrying a cylindric plunger 7, from which depends a rack-bar 8. This rack-bar and plunger are fitted to slide within a cylinder 9, supported by the partition 2 and extending a short distance down into the chamber 4. The plunger is designed to move freely and yet snugly in the cylinder to prevent entrance of ice and water therein and clogging and rusting of the weighing mechanism, while the rack-bar is of correspondingly-smaller diametrical area to provide for the reception of a coiled resistance-spring 10, which normally holds the plunger, rack-bar, and movable platform in their normal positions or at the limit of their upward movement. This spring is of predetermined resistance and is adapted as different weights or pressures are placed upon the platform to allow said platform to move down a certain distance, which through the medium of indicating mechanism yet to be described causes the weight or pressure upon the platform to be automatically determined and indicated on the exterior of the refrigerator. The plunger and cylinder are centrally disposed and are of such area as to effectually withstand the strain falling thereon and to prevent undue tilting or canting of the movable weight-platform.

The weight or pressure indicating mechanism consists of a dial 11, arranged upon the exterior of one side wall of the refrigerator and provided with a scale to indicate pounds and fractions of a pound up to any desired weight. With this scale coöperates a pointer or index-hand 12, mounted upon the outer end of a shaft 13, extending through the said side wall of the refrigerator. The inner end of this shaft is journaled in the wall of the cylinder 9 and projects thereinto and carries a pinion 14, which meshes with the rack-bar 8.

The operation of the device is as follows: The door 15, closing the top of the refrigerator, is opened and the ice rested upon the movable platform 5. The platform then moves downwardly to a greater or less extent, accordingly as the ice is heavy or light, and the rack-bar 8, meshing with the pinion 14, is thereby caused to operate the index-hand 12 through the medium of said pinion and the shaft 13, whereby the weight of the ice is indicated on the dial. As the ice melts and diminishes in weight the spring forces the platform upwardly and retracts the index-hand correspondingly, and thus the amount of ice contained in the refrigerator may at any time be ascertained.

As before stated, the plunger is fitted to slide snugly in the cylinder to prevent the inlet of water and small pieces of ice into the cylinder and obviate all liability of injury to the operating mechanism, by which means the life of the apparatus is materially enhanced.

By means of our invention, which provides a simple, cheap, and efficient construction of apparatus for the purpose, the weight of a purchased piece of ice may be ascertained in a ready and convenient manner by the purchaser and the giving of short weight detected. It also effects a material saving in ice, as the amount of ice contained in the refrigerator may be inspected without opening the door or cover and exposing the ice to the warm outside air.

Having thus described our invention, what we claim, and desire to secure by Letters Patent, is—

1. A refrigerator having an ice-chamber, in combination with ice-weighing mechanism comprising a cylinder centrally located and opening thereinto, a movable platform in said ice-chamber, a plunger extending centrally from the under side of said platform and slidably mounted in the cylinder, a resistance-spring inclosed within the cylinder and acting on the plunger, a dial and pointer on the exterior of the refrigerator, and means for communicating motion to said pointer upon the movement of the plunger, substantially as set forth.

2. A refrigerator having a partition dividing the interior thereof into an ice-chamber and a chamber to receive the articles to be cooled, in combination with ice-weighing mechanism comprising a cylinder supported by said partition, a movable platform in the ice-chamber, a plunger depending centrally from said platform and slidably mounted in said cylinder and carrying a rack-bar, a resistance-spring in the cylinder surrounding the rack-bar and acting on said plunger, a dial and pointer on the exterior of the refrigerator, and a shaft having its outer end journaled in the wall of the refrigerator and carrying said pointer, and its inner end journaled in the wall of the cylinder and carrying a pinion meshing with said rack-bar, substantially as set forth.

In testimony whereof we have hereunto set our hands in presence of two subscribing witnesses.

SAMUEL W. DODDS.
GEORGE H. ROBERTSON.

Witnesses:
  AUBER SMITH,
  J. R. McCLEAN.